(12) United States Patent
Bottari et al.

(10) Patent No.: US 11,784,714 B2
(45) Date of Patent: Oct. 10, 2023

(54) CONTROLLING COMPENSATION OF CHROMATIC DISPERSION IN OPTICAL TRANSPORT NETWORKS

(71) Applicant: Telefonaktiebolaget LM Ericsson (publ), Stockholm (SE)

(72) Inventors: Giulio Bottari, Pisa (IT); Fabio Cavaliere, Pisa (IT); Paola Iovanna, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/768,489

(22) PCT Filed: Oct. 16, 2019

(86) PCT No.: PCT/EP2019/078124
§ 371 (c)(1),
(2) Date: Apr. 13, 2022

(87) PCT Pub. No.: WO2021/073735
PCT Pub. Date: Apr. 22, 2021

(65) Prior Publication Data
US 2023/0102960 A1    Mar. 30, 2023

(51) Int. Cl.
*H04B 10/2513*    (2013.01)
*H04J 14/02*    (2006.01)

(52) U.S. Cl.
CPC .... *H04B 10/25133* (2013.01); *H04J 14/0271* (2013.01)

(58) Field of Classification Search
None
See application file for complete search history.

(56) References Cited

U.S. PATENT DOCUMENTS

2004/0213578 A1* 10/2004 Takahara ........... H04B 10/2513
398/147
2005/0244164 A1   11/2005 Miyashita et al.
(Continued)

FOREIGN PATENT DOCUMENTS

CN         1844965 A    10/2006
CN       101471732 A     7/2009
(Continued)

OTHER PUBLICATIONS

Gurzi, Pasquale, et al., "Minimum Cost Flow Based R&WA Algorithm For Dispersion and OSNR Limited All-Optical Networks", 2011 15th International Conference on Optical Network Design and Modeling (ONDM), IEEE, Feb. 8, 2011, 1-6.
(Continued)

*Primary Examiner* — Darren E Wolf
(74) *Attorney, Agent, or Firm* — Murphy, Bilak & Homiller, PLLC

(57) ABSTRACT

A method (200) of controlling compensation of chromatic dispersion in an optical transport network. The method comprises determining (202) whether a residual dispersion, RD, of a first path (3) within the network is within a defined RD range and if the RD of the first path is outside the defined RD range the method comprises identifying (204) a first tuneable dispersion compensation module, TDCM, crossed by the first path (3), configured to apply a respective value of dispersion compensation. The method also comprises determining (206) a different value of dispersion compensation to be applied by the first TDCM to bring the RD of the first path within the defined RD range; if (208) the first TDCM is crossed by at least one other path (1, 2), checking (210) that the respective RD of said at least one other path is within a respective defined RD range for said different value of dispersion compensation; and generating (212) a control signal comprising instructions configured to set the
(Continued)

first TDCM to apply said different value of dispersion compensation.

16 Claims, 9 Drawing Sheets

(56) References Cited

U.S. PATENT DOCUMENTS

| | | | |
|---|---|---|---|
| 2006/0067694 A1 | 3/2006 | Nozu | |
| 2006/0193638 A1* | 8/2006 | Akiyama | H04B 10/2513 398/147 |
| 2008/0279563 A1 | 11/2008 | Shu | |
| 2009/0238578 A1* | 9/2009 | Taylor | H04B 10/6972 398/147 |
| 2012/0263456 A1* | 10/2012 | Tanaka | H04B 10/5055 398/25 |

FOREIGN PATENT DOCUMENTS

| | | |
|---|---|---|
| WO | 2008087564 A2 | 7/2008 |
| WO | 2012163418 A1 | 12/2012 |

OTHER PUBLICATIONS

Rapporteur Q6/15, "Report of the Interim Q 6/15 meeting, London, UK, Jan. 28-31, 2019", SG15-TD255/PLEN, Study Group 15, International Telecommunication Union, Telecommunication Standardization Sector, Study Period 2017-2020, Jul. 1-12, 2019, 1-8.

Zulkifli, Nadia, et al., "Dispersion Optimised Impairment Constraint Based Routing and Wavelength Assignment Algorithms for All-Optical Networks", 8th International Conference on Transparent Optical Networks, ICTON 2006, We. A3.5, Jun. 2006, 177-180.

* cited by examiner

CONTROLLING COMPENSATION OF CHROMATIC DISPERSION IN OPTICAL TRANSPORT NETWORKS

TECHNICAL FIELD

The invention relates to a method of controlling compensation of chromatic dispersion in an optical transport network. The invention further relates to apparatus for controlling compensation of chromatic dispersion in an optical transport network and apparatus for adding a path from a first node to a second node in an optical transport network.

BACKGROUND

Recent standardization activities on 5G transport networks have created a new interest in DWDM systems based on intensity modulation and direct detection, as a cost-effective alternative to coherent optical interfaces, which compensate chromatic dispersion by equalization at the receiver.

The wavelength channels of a wavelength division multiplexing, WDM, signal undergo different distortions and losses along the path. To add to this, the individual performance of the channel transmitters and receivers is also different, so that each channel has different initial waveform distortions, and a different detection quality.

In optical transmission systems at high bit rates, i.e. >10 Gbit/s, based on direct detection, dispersion compensation is one of the most important items to be considered for design and network operations. In fact, the optical signals at the receiver need to fall within a given dispersion tolerance, i.e. a tolerated residual dispersion, RD, range, depending on the bit rate and modulation format. FIG. 1 illustrates how the dispersion levels of the optical channels in a WDM system increase with distance and are periodically brought back down using dispersion compensation modules. The dispersion profiles of the channels thus have a typical "sawtooth" shape, with dispersion compensation being applied with the goal of the channels arriving at the receiver with a residual dispersion, RD, falling within the tolerated range, RDmin, RDmax. The effect of dispersion on the system performance is typically accounted for in the form of penalty subtracted from the receiver sensitivity or optical signal to noise ratio, OSNR, budget in dB.

Conventional Dispersion Compensation Modules, DCM, are basically coils of optical fibre having a high negative dispersion, to compensate for the effect of the positive dispersion experienced by optical channels propagating in the optical fibre links of a network. More recently, tuneable DCM, TDCM, have been proposed; for example, the TeraXion ClearSpectrum TDCMX-SM and the Cisco ONS 15454 Tunable Dispersion Compensation Unit. These enable compensation of chromatic dispersion in DWDM systems in a more flexible and tailored way. For example, a TDCM may be based on a fibre grating, and the amount of dispersion compensation that is application may be tuned by changing a temperature gradient applied along the length of the grating; this changes the group delay response of the filter, which corresponds to the dispersion, that is recorded on the grating. Other TDCM solutions are based on Planar Lightwave Circuits, PLCs. TDCMs can be used in 10G, 25G 40G and 50G networks, and may also be used in combination with conventional fixed DCM, for example to remove RDs at the end of the last spans in a reconfigurable optical add drop multiplexer, ROADM, network. The tunability of a TDCM refers to the amount of dispersion compensation that is applied to whole WDM comb. TDCMs can be remotely set and configured by network control or management systems, for example following addition or rerouting of wavelength channels.

Coherent optical interfaces at 100 Gbit/s, based on dual polarization quaternary phase shift keying, QPSK, modulation, are widespread in metro networks spanning from a few hundreds to thousands of km. They do not require a device to compensate for the fibre dispersion, since this is performed by the equalizer at the receiver. However, coherent optical interfaces of this type are too expensive for 5G transport applications, such as fronthaul and backhaul, that have distances of about 20 km as a maximum.

In old 10G networks using direct detection at the receiver, dispersion compensation is achieved using fixed DCM having dispersion compensation values that are determined in the initial network planning phase. This approach is not optimal because obliges network operators to keep an inventory of installed devices and to buy spare part devices. Additional issues occur in the case of meshed wavelength switched optical networks, WSON, where each optical channel wavelength has an individual assigned route between a source node and a termination node, potentially traversing several DCM stages. When a set of optical channels, in a spectrum range, is routed on a specific end-to-end path, each channel experiences a different dispersion and a different dispersion compensation is required to ensure the RD at the receiver lies within an acceptable range. The use of fixed DCMs does not allow to "tune" the dispersion compensation appropriately if the residual dispersion exceeds imposed design limits. The only option is to "re-route" a path in an attempt to achieve an acceptable RD at the receiver. The availability of TDCMs introduces an additional degree of freedom that facilitates instantiating new paths with acceptable RD values.

SUMMARY

It is an object to provide an improved method of controlling compensation of chromatic dispersion in an optical transport network. It is a further object to provide an improved apparatus for controlling compensation of chromatic dispersion in an optical transport network. It is a further object to provide an improved apparatus for adding a path from a first node to a second node in an optical transport network.

An aspect of the invention provides a method of controlling compensation of chromatic dispersion in an optical transport network. The method comprises a step of determining whether a residual dispersion, RD, of a first path within the optical transport network is within a defined RD range. The method comprises, if the RD of the first path is outside the defined RD range, the following further steps. Step a) of identifying a first tuneable dispersion compensation module, TDCM, crossed by the first path. The first TDCM is configured to apply a respective value of dispersion compensation. Step b) of determining a different value of dispersion compensation to be applied by the first TDCM to bring the RD of the first path within the defined RD range. Step c), if the first TDCM is crossed by at least one other path, of checking that the respective RD of said at least one other path is within a respective defined RD range for said different value of dispersion compensation. And step d) of generating at least one control signal comprising instructions configured to set the first TDCM to apply said different value of dispersion compensation.

The method may reduce the residual dispersion of an optical channel, on a first optical path, by re-tuning a TDCM crossed by the path, with concurrent verification that other channels, on other paths that cross the same TDCM, do not suffer a detrimental effect on their respective residual dispersions. The method enables the TDCM to be re-tuned while minimising the impact on other paths. The method may enable every path in a network to arrive at its planned destination node with all the transported channel wavelengths presenting a RD at the relevant receiver within a defined RD range.

The method may enable the use of high-speed cost-effective direct detection optical interfaces, for example 25G non-return to zero, NRZ, and 50G 4-level phase amplitude modulation, PAM4, in the 5G transport network, overcoming the operational limitations of fixed DCMs, such as inventory, lack of configurability, and wavelength routing constraints, and may enable automatic reconfiguration of TDCMs.

In an embodiment, identifying a first TDCM comprises identifying the TDCM crossed by a lowest number of other paths. This may minimize the impact of tuning the TDCM on the RD of other paths.

In an embodiment, the method further comprises the following steps, responsive to said checking indicating that the respective RD of at least one of said lowest number of other paths is outside the respective defined RD range. The method comprises identifying a further TDCM crossed by the first path; the further TDCM is crossed by the next lowest number of paths and is configured to apply a respective value of dispersion compensation. The method comprises performing steps b) and c) for the further TDCM. The step of identifying a further TDCM and steps b) and c) are iterated until a further TDCM crossed by the first path is identified for which the respective RDs of all the other paths that cross said TDCM are within the respective defined RD ranges or until all TDCMs crossed by the first path have been considered. This may enable the TDCM to be identified that will have the least possible negative impact on the RD of other paths.

In an embodiment, step a) comprises identifying first and second TDCMs crossed by the first path, each of the first TDCM and the second TDCM is configured to apply respective dispersion values. Step b) comprises determining a different value of dispersion compensation to be applied by each of the first TDCM and the second TDCM to bring the RD of the first path within the defined RD range. Step c) comprises, if the first TDCM or the second TDCM is crossed by at least one other path, of checking that the respective RD of said at least one other path is within a respective defined RD range for said respective different value of dispersion compensation. And step d) comprises generating at least one control signal comprising instructions configured to set the first TDCM and the second TDCM to apply said respective different values of dispersion compensation. If re-tuning of a single TDCM does not provide sufficient dispersion compensation for the first path or if re-tuning of a single TDCM cannot be done without moving the RD of said at least one other path outside its respective defined RD range, re-tuning of more than one TDCM can be attempted to provide sufficient dispersion compensation for the first path. Tuning two or more TDCMs may help reduce the impact on the RD of other paths, since the amount of dispersion compensation applied by each may be changed by a smaller amount.

In an embodiment, the method further comprises, if all TDCMs crossed by the first path have been considered, determining a new route for at least one of said lowest number of other paths so that said path no longer crosses the first TDCM. Said at least one control signal comprises instructions configured to set the first TDCM to said different value of dispersion compensation determined for the first TDCM. Re-routing one, or more, of the other paths that cross the first TDCM may enable the first TDCM to be re-tuned and thus the lowest number of other paths are impacted.

In an embodiment, the optical transport network comprises nodes and links connecting pairs of nodes. The first TDCM and the further TDCMs are equivalent TDCMs representing the composite effect of respective TDCMs at terminating nodes of respective links crossed by the first path. An equivalent tuneable compensation capability may therefore be associated to a network link itself, instead of to the terminating nodes, representing the cumulative effect of the TDCMs at the terminating nodes.

In an embodiment, step b) comprises determining respective values of dispersion compensation to be applied by the respective TDCMs at the terminating nodes represented by the equivalent TDCM to cause the equivalent TDCM to apply said different value of dispersion compensation. Said at least one control signal comprises instructions configured to set the respective TDCMs at the terminating nodes to apply said respective values of dispersion compensation.

In an embodiment, the defined RD ranges are a system RD range of the optical transport network.

In an embodiment, the first path is a new path to be added in the optical transport network.

In an embodiment, the first path is an existing path and the method is performed following teardown of another path within the optical transport network. The defined RD ranges lie within a system RD range of the optical transport network. This may enable the robustness of remaining paths to be improved following teardown of a path.

In an embodiment, the optical transport network is a wavelength switched optical network, WSON.

Corresponding embodiments and advantages are also applicable to the method, apparatus and networks described below.

An aspect of the invention provides a method of adding a first path from a first node to a second node in an optical transport network. The method comprises the following steps. The method comprises a step of computing a route for the first path across the optical transport network. The method comprises a step of determining whether a residual dispersion, RD, of the first path is within a defined RD range. The method comprises, if the RD of the first path is outside the defined RD range, the following further steps. Step a) of identifying a first tuneable dispersion compensation module, TDCM, crossed by the first path. The first TDCM is configured to apply a respective value of dispersion compensation. Step b) of determining a different value of dispersion compensation to be applied by the first TDCM to bring the RD of the first path within the defined RD range. Step c), if the first TDCM is crossed by at least one other path, of checking that the respective RD of said at least one other path is within a respective defined RD range for said different value of dispersion compensation. And step d) of generating at least one control signal comprising instructions configured to set the first TDCM to apply said different value of dispersion compensation.

In an embodiment, the method further comprises, if the RD of the first path is outside the defined RD range, the following steps. The method comprises a step of computing a different route for the first path across the optical transport network. The method comprises a step of determining whether the residual dispersion, RD, of the first path on the different route is within the defined RD range. Said steps of computing and determining are iterated until a route is identified for which the RD of the first path is within the defined RD range or until all potential routes have been considered for the first path. The method comprises proceeding to the step of identifying a first TDCM, if all potential routes have been considered without finding a route for which the RD of the first path is within the defined RD range.

Corresponding embodiments and advantages are also applicable to the corresponding apparatus and network described below.

An aspect of the invention provides apparatus for controlling compensation of chromatic dispersion in an optical transport network. The apparatus comprises a processing circuitry and a memory. Said memory contains instructions executable by said processing circuitry whereby said apparatus is operative to determine whether a residual dispersion, RD, of a first path within the optical transport network is within a defined RD range. Said memory contains instructions executable by said processing circuitry whereby said apparatus is operative to, if the RD of the first path is outside the defined RD range: a) identify a first tuneable dispersion compensation module, TDCM, crossed by the first path, the first TDCM configured to apply a respective value of dispersion compensation; b) determine a different value of dispersion compensation to be applied by the first TDCM to bring the RD of the first path within the defined RD range; c) if the first TDCM is crossed by at least one other path, check that the respective RD of said at least one other path is within a respective defined RD range for said different value of dispersion compensation; and d) generate at least one control signal comprising instructions configured to set the first TDCM to apply said different value of dispersion compensation.

An aspect of the invention provides apparatus for adding a first path from a first node to a second node in an optical transport network. The apparatus comprises a processing circuitry and a memory. Said memory contains instructions executable by said processing circuitry whereby said apparatus is operative to compute a route for the first path across the optical transport network. Said memory contains instructions executable by said processing circuitry whereby said apparatus is operative to determine whether a residual dispersion, RD, of the first path is within a defined RD range. Said memory contains instructions executable by said processing circuitry whereby said apparatus is operative to, if the RD of the first path is outside the defined RD range: a) identify a first tuneable dispersion compensation module, TDCM, crossed by the first path, the first TDCM configured to apply a respective value of dispersion compensation; b) determine a different value of dispersion compensation to be applied by the first TDCM to bring the RD of the first path within the defined RD range; c) if the first TDCM is crossed by at least one other path, check that the respective RD of said at least one other path is within a respective defined RD range for said different value of dispersion compensation; and d) generate at least one control signal comprising instructions configured to set the first TDCM to apply said different value of dispersion compensation.

In an embodiment, said memory contains instructions executable by said processing circuitry whereby said apparatus is operative, responsive to the RD of the first path being outside the defined RD range, to: compute a different route for the first path across the optical transport network; determine whether the residual dispersion, RD, of the first path on the different route is within the defined RD range. Said memory contains instructions executable by said processing circuitry whereby said apparatus is operative to iterate said computing and determining until a route is identified for which the RD of the first path is within the defined RD range or until all potential routes have been considered for the first path. Said memory contains instructions executable by said processing circuitry whereby said apparatus is operative to, if all potential routes have been considered without finding a route for which the RD of the first path is within the defined RD range, proceed (or rather return) to identifying the first tuneable dispersion compensation module, TDCM, crossed by the first path and to perform the other operations described earlier including determining a different value of dispersion compensation, etc.

An aspect of the invention provides an optical transport network comprising nodes and links connecting pairs of nodes and an apparatus for controlling compensation of chromatic dispersion in said optical transport network. The apparatus comprises a processing circuitry and a memory. The memory contains instructions executable by said processing circuitry whereby said apparatus is operative to determine whether a residual dispersion, RD, of a first path within the optical transport network is within a defined RD range. If the RD of the first path is outside the defined RD range the apparatus is operative to identify a first tuneable dispersion compensation module, TDCM, crossed by the first path, the first TDCM being configured to apply a respective value of dispersion compensation. The apparatus also being operative to determine a different value of dispersion compensation to be applied by the first TDCM to bring the RD of the first path within the defined RD range and if the first TDCM is crossed by at least one other path, check that the respective RD of said at least one other path is within a respective defined RD range for said different value of dispersion compensation. Further the apparatus is operative to generate at least one control signal comprising instructions configured to set the first TDCM to apply said different value of dispersion compensation.

In an embodiment, the apparatus comprises a network management system.

An aspect of the invention provides a computer program, comprising instructions which, when executed on at least one processor, cause the at least one processor to carry out any of the above steps of the method of controlling compensation of chromatic dispersion in an optical transport network.

An aspect of the invention provides a computer program, comprising instructions which, when executed on at least one processor, cause the at least one processor to carry out any of the above steps of the method of adding a first path from a first node to a second node in an optical transport network.

An aspect of the invention provides a data carrier having computer readable instructions embodied therein. The said computer readable instructions are for providing access to resources available on a processor. The computer readable instructions comprise instructions to cause the processor to perform any of the above steps of the method of controlling compensation of chromatic dispersion in an optical transport network.

In an embodiment, the data carrier is a non-transitory data carrier.

An aspect of the invention provides a data carrier having computer readable instructions embodied therein. The said computer readable instructions are for providing access to resources available on a processor. The computer readable instructions comprise instructions to cause the processor to perform any of the above steps of the method of adding a first path from a first node to a second node in an optical transport network.

In an embodiment, the data carrier is a non-transitory data carrier.

Embodiments of the invention will now be described, by way of example only, with reference to the accompanying drawings.

DETAILED DESCRIPTION

The same reference numbers will used for corresponding features in different embodiments.

Figure 1:
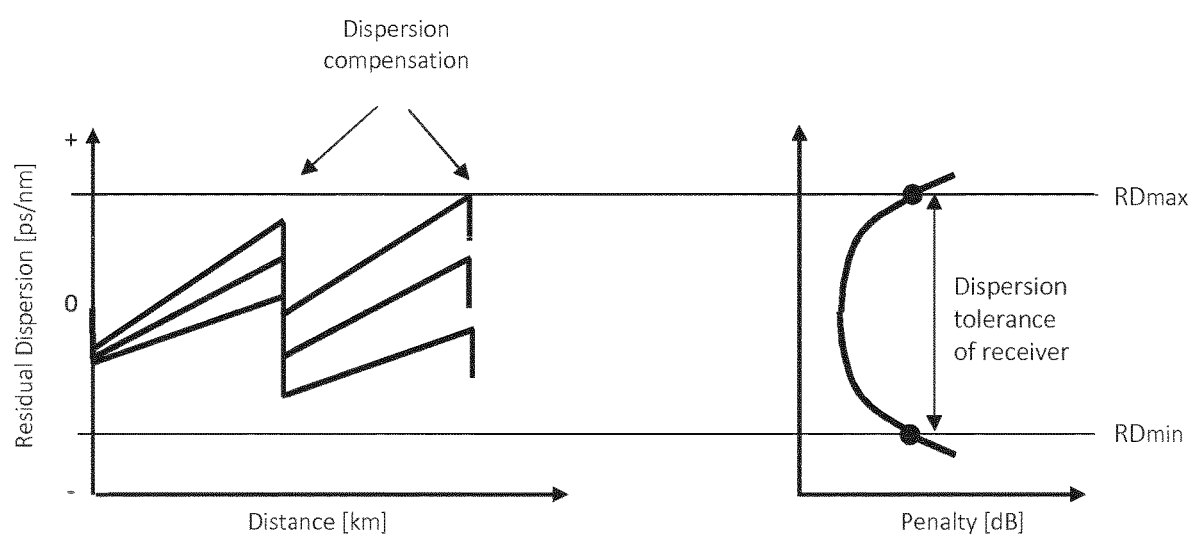
FIG. 1 illustrates variation of residual dispersion compensation with propagation distance and dispersion tolerance, i.e. the tolerated RD range, of a receiver.
Figure 2:
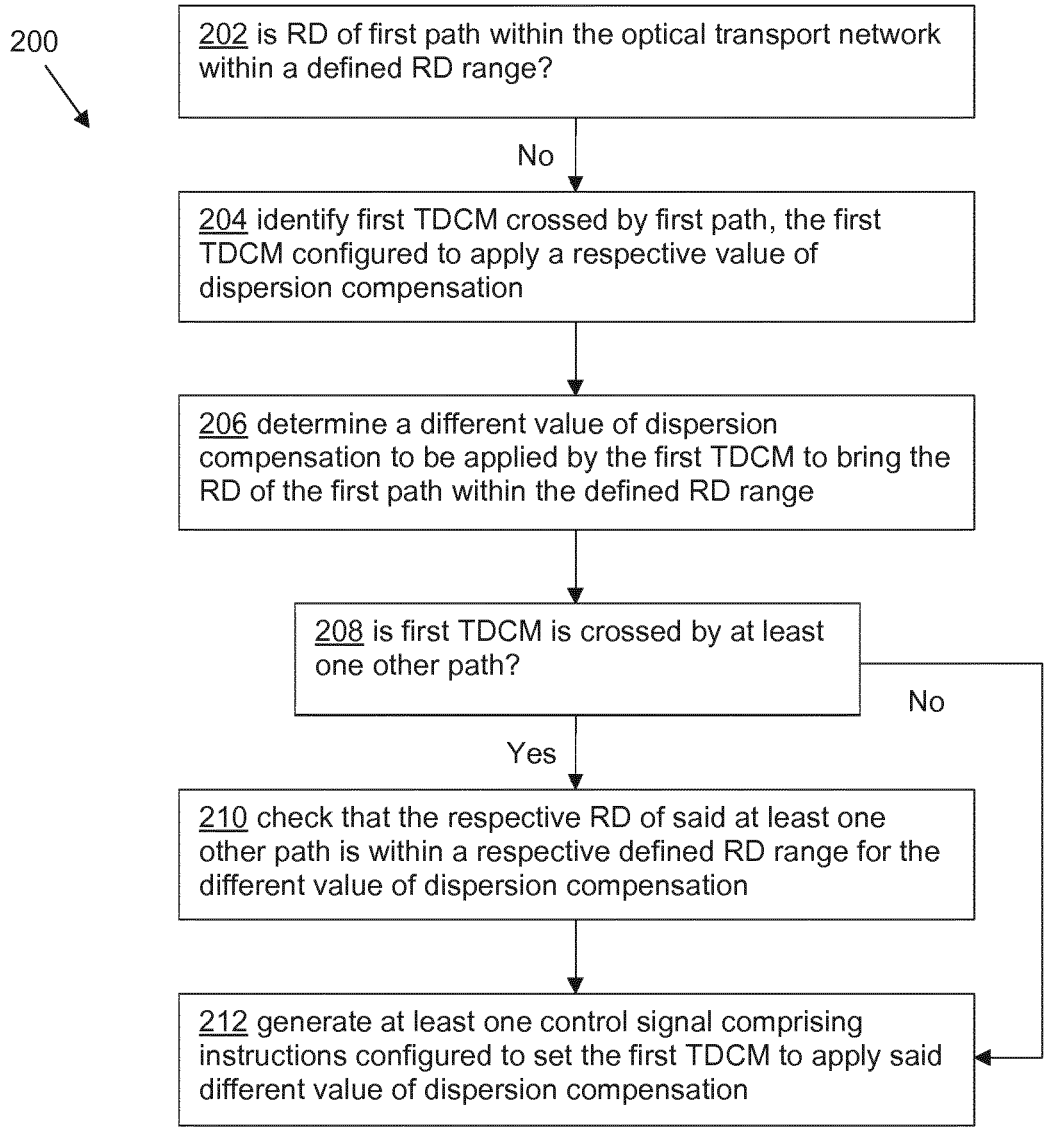
FIGS. 2, 7A and 7B are flowcharts illustrating embodiments of method steps.
Figure 6:
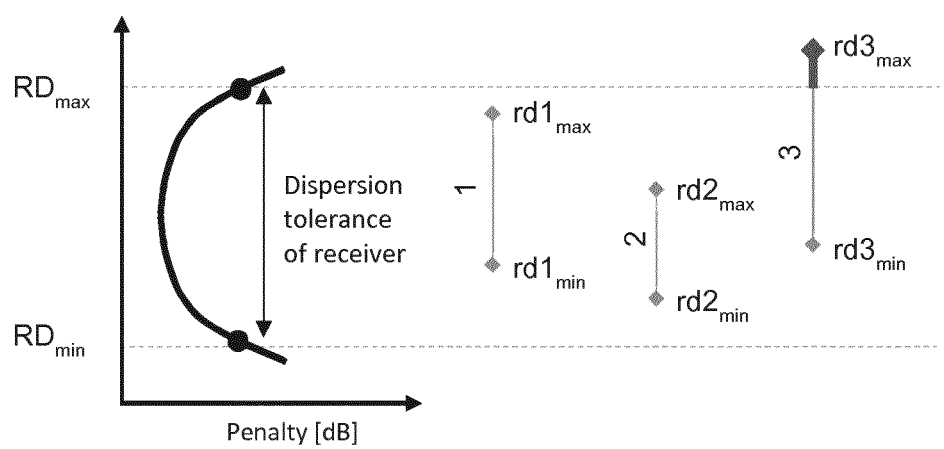
FIG. 6 illustrates residual dispersions of the paths across the network of FIG. 5.

Referring to FIGS. 2 and 6, an embodiment of the invention provides a method 200 of controlling compensation of chromatic dispersion in an optical transport network. The method comprises steps of:

determining 202 whether a residual dispersion, RD, of a first path 3 within the optical transport network is within a defined RD range; and if the RD of the first path is outside the defined RD range:

a) identifying 204 a first tuneable dispersion compensation module, TDCM, crossed by the first path, the first TDCM configured to apply a respective value of dispersion compensation;

b) determining 206 a different value of dispersion compensation to be applied by the first TDCM to bring the RD of the first path within the defined RD range;

c) if 208 the first TDCM is crossed by at least one other path 1, 2, checking 210, 316 that the respective RD of said at least one other path is within a respective defined RD range for said different value of dispersion compensation; and d) generating 212 at least one control signal comprising instructions configured to set the first TDCM to apply said different value of dispersion compensation.

In an embodiment, the step of identifying 204 a first TDCM comprises identifying the TDCM crossed by the lowest number of other paths.

In an embodiment, the method further comprises, responsive to the step of checking 210 indicating that the RD of at least one of the other paths that crosses the first TDCM is outside the defined RD range for that other path:

identifying a further TDCM crossed by the first path; and performing steps b) and c) for the further TDCM.

The further TDCM is the TDCM that is crossed by the next lowest number of paths. The further TDCM is configured to apply a respective value of dispersion compensation.

The step of identifying a further TDCM, step b) and step c) are iterated until a further TDCM crossed by the first path is identified for which the respective RDs of all the other paths that cross that TDCM are within their respective defined RD ranges or until all of the TDCMs crossed by the first path have been considered.

Figure 3:
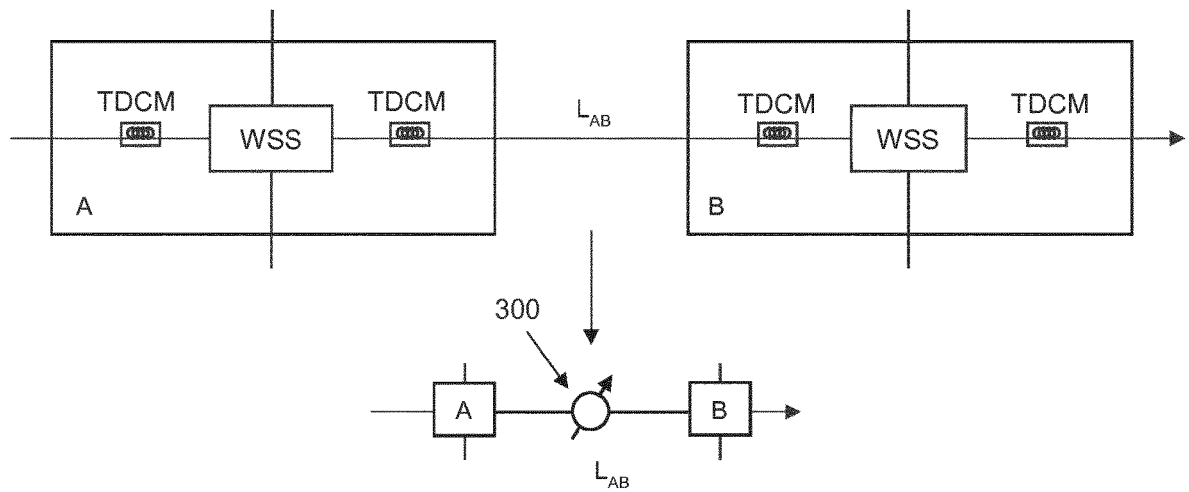
FIG. 3 illustrates terminating nodes of a link having TDCMs and an equivalent TDCM of the link.
Figure 4:
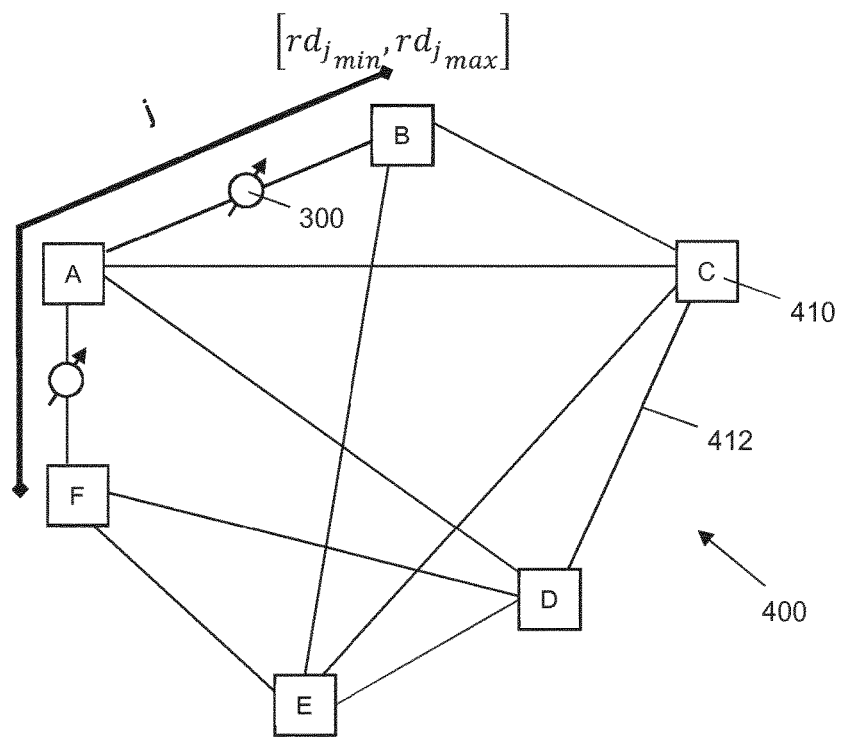
FIGS. 4 and 5 illustrate a WDM meshed network to which embodiments of the invention may be applied.

Referring to FIGS. 3 and 4, in an embodiment the optical transport network is a wavelength switched optical network, WSON, comprising nodes and links connecting pairs of nodes. The nodes each comprise wavelength selective switches, WSS, and TDCMs on input/output directions. The nodes connected by Circuits in the network, named "paths", constituted by sets of wavelengths (optical channels) in a WDM comb, spanning from a source node to a destination node and crossing a sequence of optical fibre links, L. A tuneable compensation capability is associated to each link as explained in the following.

The residual chromatic dispersion ("residual dispersion", RD) is the amount of chromatic dispersion, in ps/nm, that affects an optical signal due to the mismatch between the amount of dispersion compensation that a dispersion compensator, a TDCM in this case, can apply and the actual value of dispersion that an optical signal experiences as a result of traversing an optical fibre link.

The first TDCM and the further TDCMs are equivalent TDCMs, represented by a circle with an arrow through in FIGS. 3 and 4, representing the composite effect of respective TDCMs at terminating nodes of respective links crossed by the first path. An equivalent tuneable compensation capability may therefore be associated to a network link itself, instead of to the terminating nodes, representing the cumulative effect of the TDCMs at the terminating nodes.

Implementing the method 200 may enable every path in the network to arrive at its planned destination node with all the transported wavelengths presenting a RD on the relevant receiver that fall within the defined RD range: [RDmin, RDmax]. In an embodiment, the RD range is a system RD range of the optical transport network. The RD range is therefore a system design constraint, valid for all network nodes in the network (assuming the same hardware is used for all the nodes).

Referring to FIG. 3, a tuneable dispersion compensation capability is associated to each link as follows. In this example, two optical nodes A and B connected by a link $L_{AB}$. In this example, only East and West TDCMs are shown but it will be appreciated that TDCMs would typically be provided for North and South directions also. Compensation of WDM signals crossing $L_{AB}$ can be achieved by tuning the East TDCM in A and/or the West TDCM in B. An equivalent TDCM 300 is associated to link $L_{AB}$, instead of to the terminating nodes A and B, representing the cumulative effect of the TDCMs at the two terminating nodes. The "tunability" feature refers to the amount of dispersion compensation applied to all the wavelengths crossing the link.

In an embodiment, if a single TDCM cannot be re-tuned to provide sufficient dispersion compensation to bring the RD of the first path within its defined RD range, re-tuning of multiple TDCMs may be attempted. In this embodiment, step a) comprises identifying first and second TDCMs crossed by the first path, each being configured to apply respective dispersion values.

Step b) comprises determining a different value of dispersion compensation to be applied by each of the first TDCM and the second TDCM to bring the RD of the first path within the defined RD range. Step c) comprises, if the first TDCM or the second TDCM is crossed another path, checking that the respective RD of the other path will still be within within its respective defined RD range if the first TDCM and/or the second TDCM is retuned to the respective different value of dispersion compensation. Step c) is performed for each other path that crosses one or both of the first and second TDCMs. Step d) comprises generating at least one control signal comprising instructions configured to set the first TDCM and the second TDCM to apply the respective different values of dispersion compensation.

This example considers first and second TDCMs, but it will be appreciated that more than two TDCMs crossed by the first path may be identified and new values of dispersion compensation determined for each.

Figure 5:
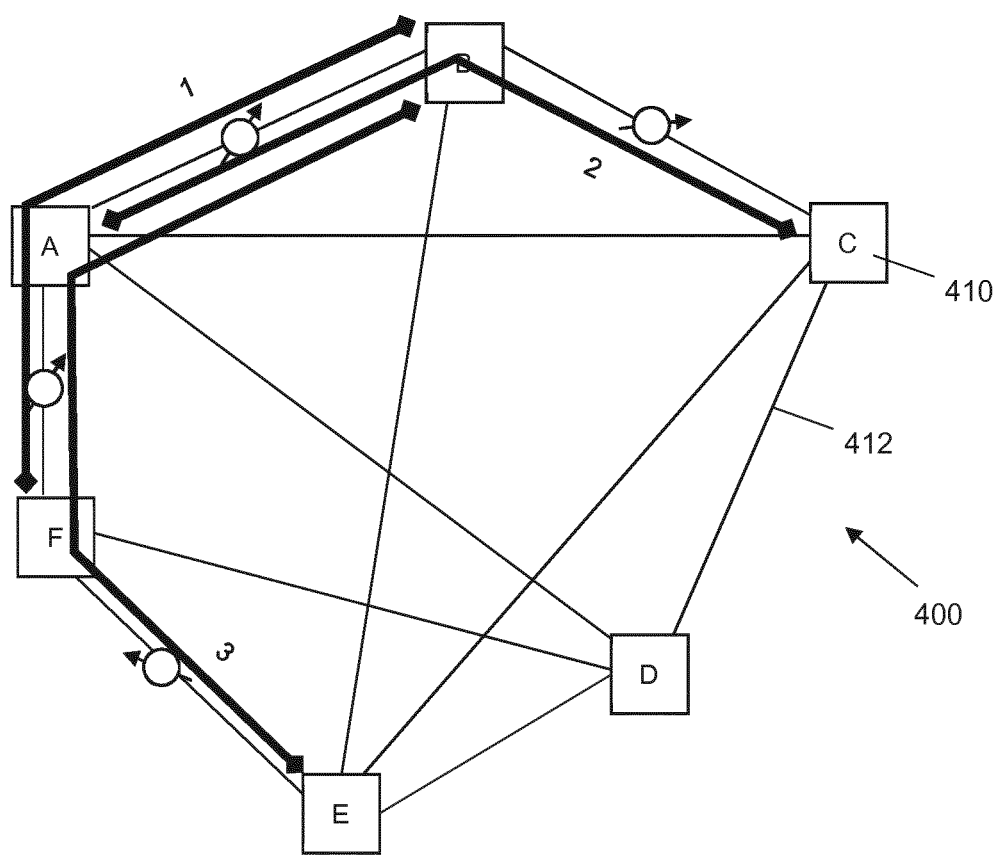

For example, referring to FIG. 5, retuning the TDCM for link $L_{AB}$ may not provide sufficient dispersion compensation for path 3, so retuning of the TDCM for link $L_{FA}$ may also be considered. The effect on the RD of paths 1 and 2 must be checked for retuning the TDCM for link $L_{AB}$ and the effect on the RD of path 1 must be checked for retuning the TDCM for link $L_{FA}$.

In an embodiment, the method further comprises, if all TDCMs crossed by the first path have been considered, determining a new route for at least one of said lowest number of other paths so that said path no longer crosses the first TDCM. The at least one control signal comprises instructions configured to set the first TDCM to said different value of dispersion compensation determined for the first TDCM.

In an embodiment, the defined RD ranges of the optical paths are a system RD range of the optical transport network. The system RD range may be associated with the receiver specifications of the network nodes.

In an embodiment, the first path is a new path to be added in the optical transport network.

In an embodiment, the first path is an existing path and the method is performed following teardown of another path within the optical transport network. The defined RD ranges lie within a system RD range of the optical transport network. This may be performed to improve the robustness of the remaining paths to future retuning of TDCMs on their paths.

FIGS. 4 and 5 illustrate a meshed WSON 400 to which the method 200 described above may be applied.

In the example, Path j traverses link FA and AB having two equivalent TDCMs 300 on its path, one per link. For clarity, FIGS. 4 and 5 show equivalent TDCMs only for the paths being considered but it will be appreciated that each link may have an equivalent TDCM. Path j is used to transport a subset of n wavelengths in a Dense WDM, DWDM, comb having N wavelength channels. For example, path j could transport n=10 wavelengths out of N=40 for a system having a DWDM comb comprising 40 wavelength channels.

At the terminating node, B, after all the TDCMs encountered in the traversed nodes, the effective RD for Path j is computed:

$$[rd_{jmin}, rd_{jmax}]$$

where $rd_{jmin}$ is the RD of the first wavelength channels transported on the path and $rd_{jmax}$ is the RD of the tenth wavelength channel transported on the path. The eight intermediate wavelength channels have RDs that fall between $rd_{jmin}$ and $rd_{jmax}$. An upper RD margin, $u_j$, and a lower RD margin, $l_j$, are defined as follows:

$$u_j = RD_{max} - rd_{jmax}$$

$$l_j = rd_{jmin} - RD_{min}$$

If both margins are positive, the RD of Path j is within the defined RD range, [RDmin, RDmax]. In general, these conditions are fulfilled, at the respective terminating nodes, by all the paths simultaneously active in the network. This may be assumed as a starting condition for the network.

FIG. 5 illustrates the case in which three paths are active in the considered network: Path 1 from node F to node B; Path 2 from node A to node C; and Path 3 from node E to node B. The RD ranges of the three paths are shown on the penalty graph of 6, from which it can be see that the RD of Path 3 exceeds the defined RD range, [$RD_{min}$, $RD_{max}$], at the receiver at node B. The RDs of Path 1 and Path 2 are within their respective defined RD ranges at the relevant receivers at nodes B and C, respectively.

Path 3 crosses three links, $L_{EF}$, $L_{FA}$ and $L_{AB}$. If a change to the amount of dispersion compensation applied to path 3 is done by re-tuning the equivalent TDCM of $L_{EF}$, only Path 3 is impacted, and the RD range of path 3 can be translated to within the defined RD range without affecting the RD of the other paths. If a change to the amount of dispersion compensation applied to path 3 is done by re-tuning the equivalent TDCM of $L_{FA}$, Path 1 is impacted and its minimum and maximum RDs, i.e. its RD range, will be "translated" along with those of Path 3, and must remain within the defined RD range, [$RD_{min}$, $RD_{max}$], for the re-tuning of TDCM $L_{FA}$ to be acceptable. Finally, if a change to the amount of dispersion compensation applied to path 3 is done by re-tuning the equivalent TDCM of $L_{AB}$, this would also impact Path 2 and its RD values.

TABLE 1

| | $TDCM_{AB}$ | $TDCM_{BC}$ | ... | $TDCM_{FA}$ | ... | $TDCM_{EF}$ | ... | $l_i$ | $u_i$ |
|---|---|---|---|---|---|---|---|---|---|
| Path 1 | Y | | | Y | | | | $l_1 > 0$ | $u_1 > 0$ |
| Path 2 | Y | Y | | | | | | $l_2 > 0$ | $u_2 > 0$ |
| Path 3 | Y | N | | Y | | Y | | $l_3 > 0$ | $u_3 < 0$ |
| ... | | | | | | | | | |

Table 1 summarizes the above example. It represents, for each path, which TDCMs are present on the respective paths and, in the last two columns, the lower and upper margins. In the example, $u_3 < 0$ because, as illustrated in 6, the RD range of Path 3 exceeds the upper limit $RD_{max}$.

Figure 7A:
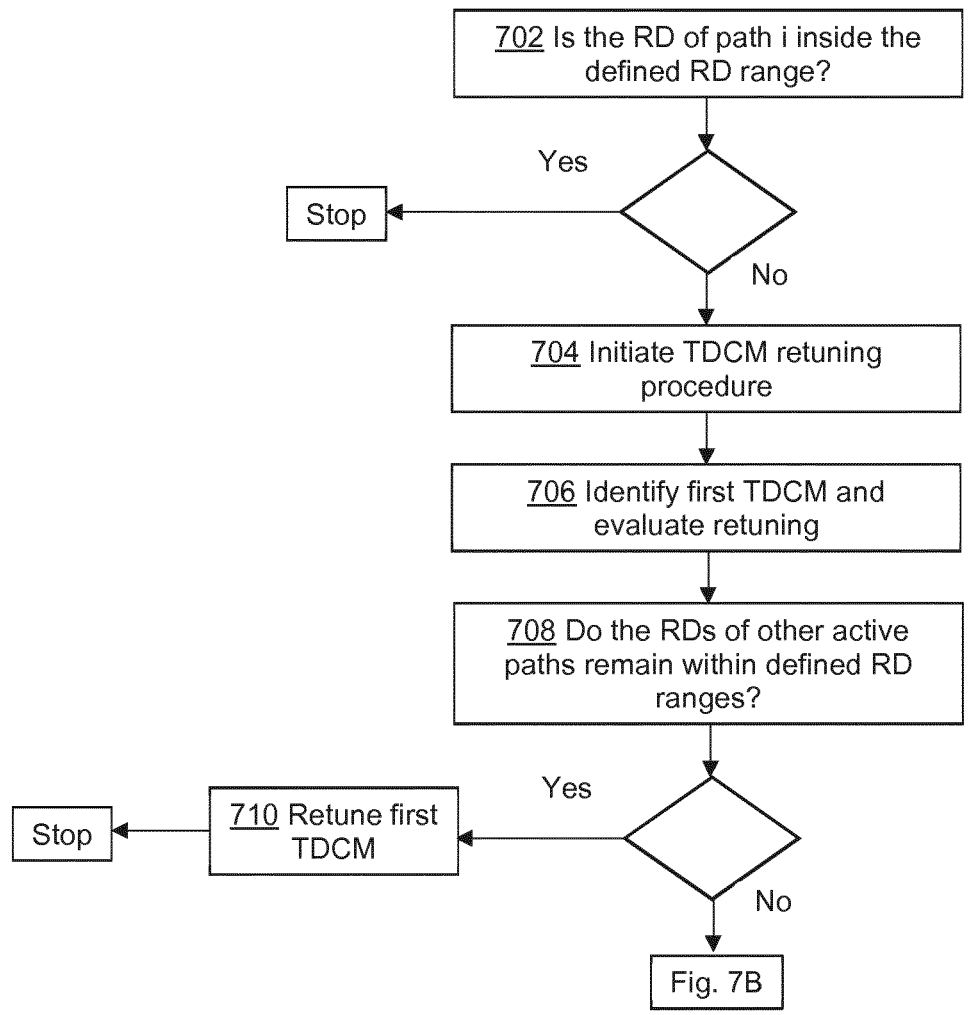
Figure 7B:
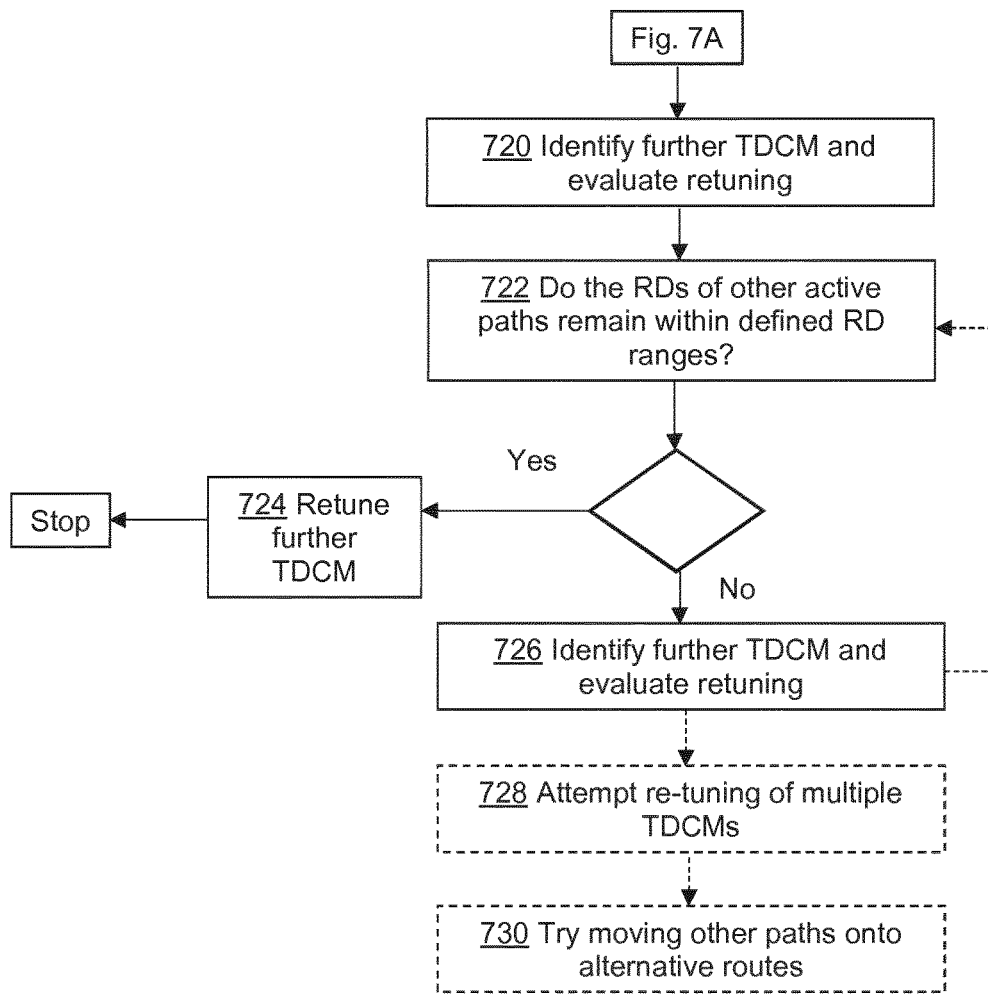

Referring to FIGS. 7A and 7B, for a path, i, if $l_i < 0$ or $u_i < 0$ the path is not appropriately compensated, i.e. if 702 the RD of path i is not inside the defined RD range, a re-tuning 704 of TDCMs is attempted to bring the RD of path i inside the defined RD range at the receiver at its terminal node. The goal is to find the best re-tuning setup while minimizing the impact on the other paths. These steps are followed:

Among all the possible TDCMs on the route of path i, identify 706 a first TDCM, being the one which is crossed by the minimum number of other paths. Tune the first TDCM to move the RD of path i inside the boundaries (i.e. $l_i$>0 and $u_i$>0). In the example of Table 1, the identified first TDCM is $TDCM_{EF}$ which is crossed by Path 3 alone.

If the first TDCM is crossed by other paths, check 708 whether all the relevant RD ranges remain positive after tuning. If yes, a control signal is generated to retune the first TDCM 710 and the procedure is finished. Otherwise move to the next step.

Among all the possible TDCMs on the route of path i, identify 720 a further TDCM, being the TDCM which is crossed by the second minimum number of other paths in the network. It is $TDCM_{BC}$ in the example, involving two paths. Tune the further TDCM to move the RD of path i inside the boundaries and, simultaneously, check 722 if the RD of the other involved paths is not displaced outside of the boundaries. In the example of Table 1, tuning $TDCM_{BC}$ affects Path 2 and Path 3. In this case it's important that RD of Path 2, even if "translated" with the one of Path 3, remains in the boundaries.

The procedure is iterated 726 until a suitable TDCM, on the route of path i, is identified.

In an embodiment, where the action of tuning a single TDCM, as described above with referent to FIGS. 7A and 7B, is unsuccessful because tuning a single TDCM does not sufficiently change the dispersion compensation applied to path i or because tuning a single TDCM brings problems to other paths instantiated in the network, a re-tuning 728 of multiple TDCMs can be attempted. In the example, RD of Path 3 could be moved inside the boundaries by both tuning $TDCM_{EF}$ and $TDCM_{BC}$.

In an embodiment, if the above described steps do not solve the problem for path i, the final option is to try moving 730 other paths onto alternative routes within the network. In the example, Path 2 could be moved to the direct route AC becoming completely disjoined from Path 3.

Another important element is the "robustness" of each path to the compensation re-tuning on its route. The wider the margins li and ui of a path i, the more robust the path is to re-tuning of one or more TDCMs that it crosses. In steps described above, the re-routing of paths should also promote routes having higher margins, i.e. greater robustness, to facilitate future retuning of TDCMs.

The embodiments of the invention provide a method that reduces the residual dispersion affecting optical channels, by re-routing the relevant paths and/or re-tuning the TDCMs crossed by the optical channels. The method targets the instantiation of new optical channels with the concurrent verification that the existing channels do not suffer a detrimental effect on the respective residual dispersions.

If a new acceptable path is not available, a re-tuning of TDCMs is attempted to bring the RD of the path inside the RD boundaries of the receiver at the terminal node of the path. The goal of the proposed method is to find the best re-tuning setup of TDCMs while minimizing the impact of re-tuning TDCMs on the other paths. These steps are followed:

Among all the possible TDCMs on the route of the new path, identify the one which is crossed by the minimum number of other paths. Tune such TDCM to move the RD of the path inside the acceptable boundaries.

If the identified TDCM is crossed by other paths, verify if all the relevant RD ranges remain positive after tuning. If yes, the procedure is finished. Otherwise move to the next step.

Among all the possible TDCMs on the route of the new path, identify the one which is crossed by the second minimum number of other paths in the network. Tune such TDCM to move the RD of new Path inside the boundaries and, simultaneously, check if the RD of the other involved paths is not displaced outside of the boundaries.

The procedure is iterated until a suitable TDCM, is identified.

The method allows the use of high-speed cost-effective direct detection optical interfaces, for example 25G NRZ and 50G PAM4, in the 5G transport network, overcoming the operational issues (inventory, lack of configurability, wavelength routing constraints) of fixed DCMs and providing a method for automatic reconfiguration of TDCM.

The method may provide a cheaper alternative to DWDM coherent technology for 1000 and higher transmission rates; the state-of-art technology is by far too expensive for backhaul and aggregation applications. The method enables optical paths in a network to be routed through links with a tuneable dispersion compensation in order to let them collect their target dispersion compensation. The method therefore provides a reversed approach with respect to traditional networks where dispersion compensation is fixed and computed at link and aggregated DWDM bundle level.

The method addresses possible future network topologies where interconnection flexibility is introduced at the DWDM layer in 5G networks. This may enable meshed networks within 5G fronthaul/backhaul in which optical bypass is exploited to avoid overprovisioning of router/switches resources.

Corresponding embodiments and advantages are also applicable to the method of adding a first path from a first node to a second node in an optical transport network and the apparatus described below.

Figure 8:
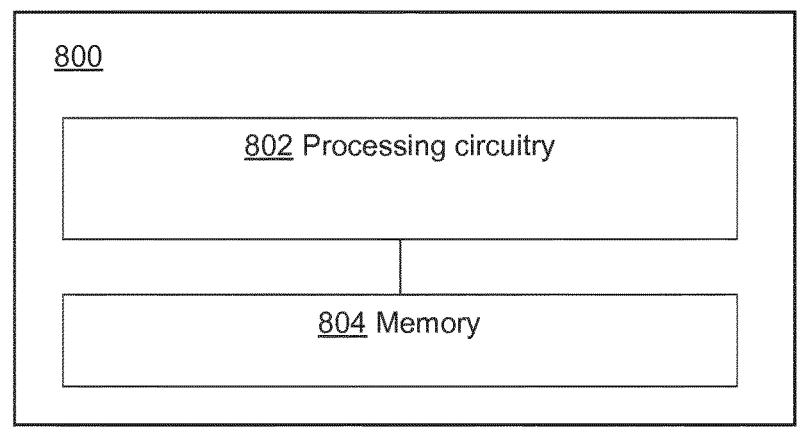
FIG. 8 is a block diagram of an apparatus according to an embodiment.

Referring to FIG. 8, an embodiment provides an apparatus 800 for controlling compensation of chromatic dispersion in an optical transport network. The apparatus comprises a processing circuitry 802 and a memory 804, containing instructions executable by the processing circuitry whereby the apparatus is operative to:

determine whether a residual dispersion, RD, of a first path within the optical transport network is within a defined RD range; and if the RD of the first path is outside the defined RD range:

a) identify a first tuneable dispersion compensation module, TDCM, crossed by the first path, the first TDCM configured to apply a respective value of dispersion compensation;

b) determine a different value of dispersion compensation to be applied by the first TDCM to bring the RD of the first path within the defined RD range;

c) if the first TDCM is crossed by at least one other path, check that the respective RD of said at least one other path is within a respective defined RD range for said different value of dispersion compensation; and d) generate at least one control signal comprising instructions configured to set the first TDCM to apply said different value of dispersion compensation.

Figure 9:
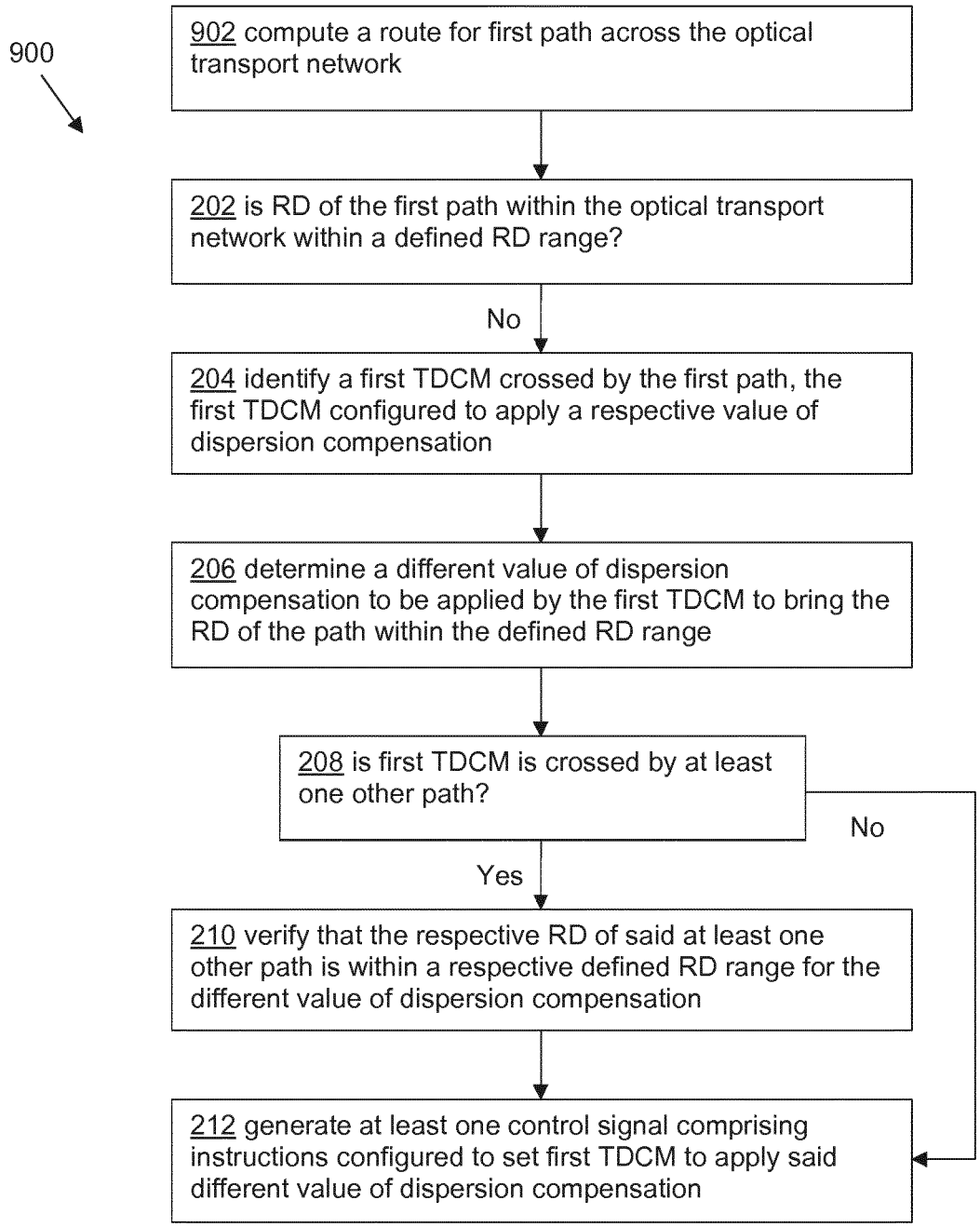
FIGS. 9 and 10 are flowcharts illustrating embodiments of method steps.

Referring to FIG. 9, an embodiment provides a method 900 of adding a first path from a first node to a second node in an optical transport network. The method comprises steps of:

computing 902 a route for the first path across the optical transport network; and performing the method 200 of controlling compensation of chromatic dispersion in an optical transport network as described above with reference to FIG. 2.

Figure 10A:
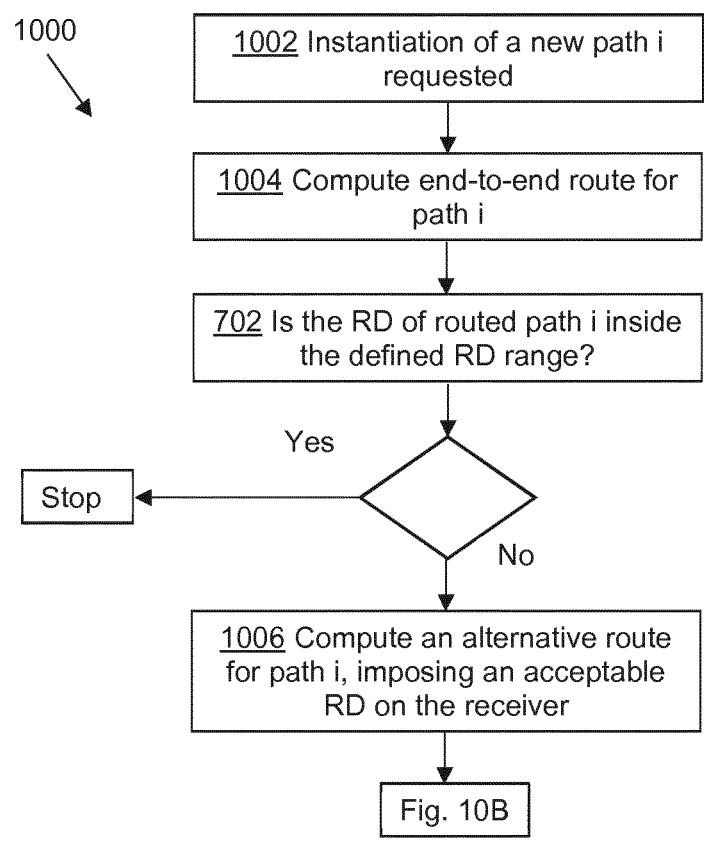
Figure 10B:
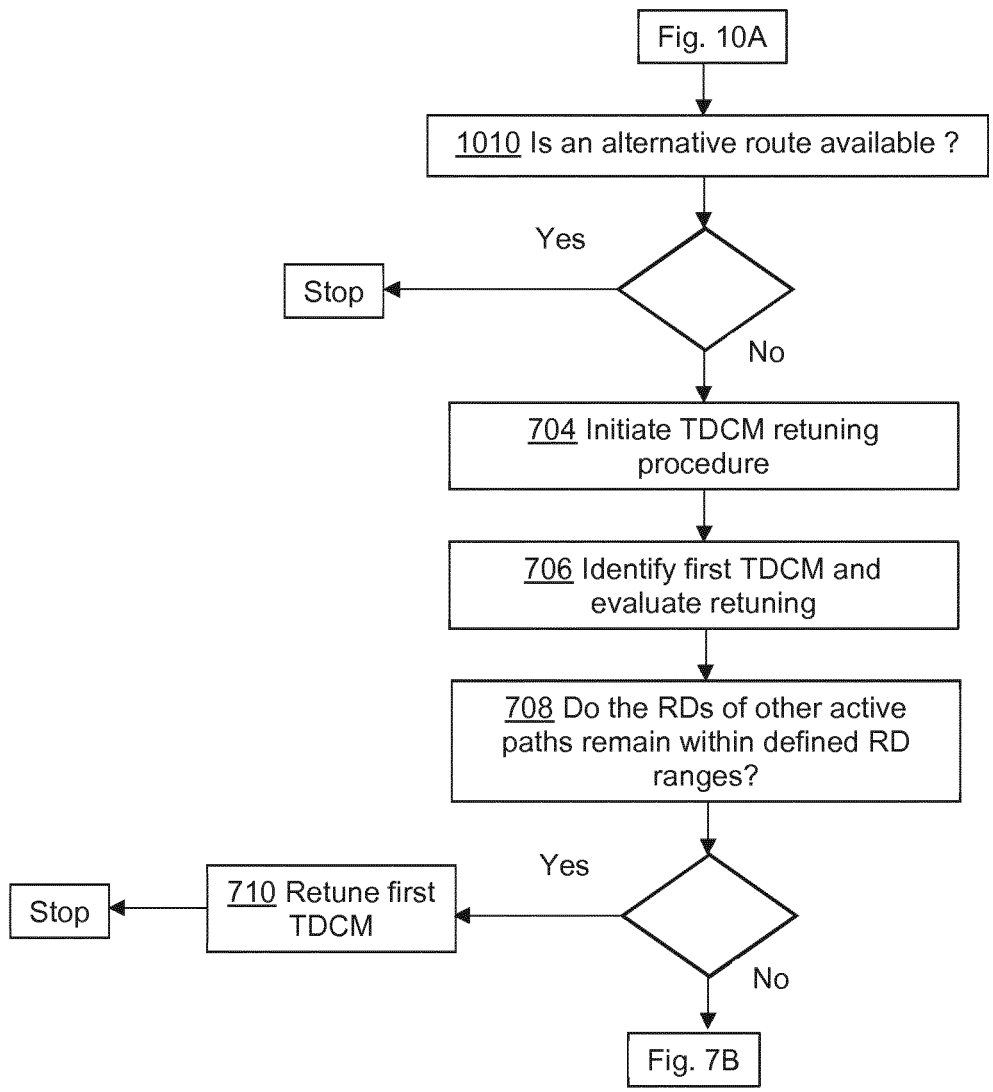

Referring to FIG. 10, an embodiment provides a method 1000 of adding a first path from a first node to a second node in an optical transport network. As a starting point may be considered that the network has been designed with the appropriate dispersion compensation for all the paths which are initially instantiated. In other words, at the beginning of network operations, the RDs of all the paths are inside the defined RD range: i.e. all cells of the last two columns of Table 1 contains positive values.

The method comprises the following steps. A request for instantiation of a new path i is received 1002 and a routing engine computes 1004 an end-to-end route for the path i across the optical transport network. The route is computed following specific criteria such as administrative cost, wavelength continuity, and impairments constraints. The condition that the RD of the path i must be within the defined RD range is not imposed as a constraint during computation of the route. The method then proceeds to determining 702 whether the RD of the path i, on the computed route, is within the defined RD range. If yes, adding of the path i is concluded.

If the RD of the path i is not within the defined RD range, the method proceeds to computing 1006 an alternative route for path i across the optical transport network. The routing engine computes alternative end-to-end routes, following specific criteria such as administrative cost, wavelength continuity, impairments constraints. The condition that the RD of the Path must be within the defined RD range is now imposed as constraint during route computation; all routes having RDs that fall outside the defined RD range are discarded. If an alternative route is available 1010 for which the RD of the Path must be within the defined RD range, adding of the path is concluded on that route.

If an alternative path is not available, for example if the cost of the new route exceeds a target value or if it is not possible to find a new route with end-to-end wavelength continuity, the method proceeds to the steps of re-tuning TDCMs, as described above with reference to FIGS. 7A and 7B. A re-tuning of TDCMs is attempted to bring the RD of the original path i inside the defined RD range at its receiver. The goal is to find the best re-tuning setup while minimizing the impact on the other paths.

Referring to FIG. 8, an embodiment of the invention provides an apparatus 800 for adding a first path from a first node to a second node in an optical transport network. The apparatus comprises a processing circuitry 802 and a memory 804. The memory contains instructions executable by the processing circuitry whereby said apparatus is operative to compute a route for the first path across the optical transport network. The apparatus 800 is also operative to determine whether a residual dispersion, RD, of the first path is within a defined RD range. If the RD of the first path is outside the defined RD range the apparatus 800 is operative to identify a first tuneable dispersion compensation module, TDCM, crossed by the first path. In a preferred embodiment the first TDCM is configured to apply a respective value of dispersion compensation. Further the apparatus 800 is operative to determine a different value of dispersion compensation to be applied by the first TDCM to bring the RD of the first path within the defined RD range. If the first TDCM is crossed by at least one other path, the apparatus is operative to check that the respective RD of said at least one other path is within a respective defined RD range for said different value of dispersion compensation and generate at least one control signal comprising instructions configured to set the first TDCM to apply said different value of dispersion compensation.

In an embodiment, the memory 804 contains instructions executable by the processing circuitry 802 whereby said apparatus is operative, responsive to the RD of the first path being outside the defined RD range, to compute a different route for the first path across the optical transport network and determine whether the residual dispersion, RD, of the first path on the different route is within the defined RD range. Further, the apparatus is operative to iterate said computing and determining until a route is identified for which the RD of the first path is within the defined RD range or until all potential routes have been considered for the first path. If all potential routes have been considered without finding a route for which the RD of the first path is within the defined RD range, the apparatus is operative to proceed (or rather return) to identifying the first tuneable dispersion compensation module, TDCM, crossed by the first path and the operations described earlier including determining a different value of dispersion compensation.

An embodiment provides an optical transport network 400, as illustrated in FIGS. 4 and 5. The optical transport network is a WSON, comprises a plurality of nodes 410 and a plurality of links 412 interconnecting the nodes. The WSON further comprises an apparatus 800 for controlling compensation of chromatic dispersion in the optical transport network, as described above with reference to FIG. 8. In this example, the apparatus comprises a network management system, NMS, which may be provided in one of the nodes 410 or which may be provided in a further node or a server (not shown).

In a further embodiment, WSON 400 alternatively comprises an apparatus 800 for adding a path from a first node to a second node in the WSON, as described above with reference to FIG. 8. In this example, the apparatus comprises a network management system, NMS, which may be provided in one of the nodes 410 or which may be provided in a further node or a server (not shown). An embodiment provides a computer program, comprising instructions which, when executed on at least one processor, cause the at least one processor to carry out any of the above steps of the method 200, 700 of controlling compensation of chromatic dispersion in an optical transport network.

An embodiment provides a computer program, comprising instructions which, when executed on at least one processor, cause the at least one processor to carry out any of the above steps of the method 200, 700 of controlling compensation of chromatic dispersion in an optical transport network.

An embodiment provides a computer program, comprising instructions which, when executed on at least one processor, cause the at least one processor to carry out any of the above steps of the method 900, 1000 of adding a first path from a first node to a second node in an optical transport network.

An aspect of the invention provides a data carrier having computer readable instructions embodied therein. The said computer readable instructions are for providing access to resources available on a processor. The computer readable instructions comprise instructions to cause the processor to perform any of the above steps of the method 200, 700 of controlling compensation of chromatic dispersion in an optical transport network.

In an embodiment, the data carrier is a non-transitory data carrier.

An aspect of the invention provides a data carrier having computer readable instructions embodied therein. The said computer readable instructions are for providing access to resources available on a processor. The computer readable instructions comprise instructions to cause the processor to perform any of the above steps of the method 900, 1000 of adding a first path from a first node to a second node in an optical transport network.

In an embodiment, the data carrier is a non-transitory data carrier.

The invention claimed is:

1. A method of controlling compensation of chromatic dispersion in an optical transport network, the method comprising steps of:
   determining whether a residual dispersion (RD) of a first path within the optical transport network is within a defined RD range;
   responsive to the RD of the first path being outside the defined RD range:
      a) identifying a first tuneable dispersion compensation module (TDCM) crossed by the first path, the first TDCM configured to apply a respective value of dispersion compensation, wherein identifying the first TDCM comprises identifying a TDCM crossed by a lowest number of other paths;
      b) determining a different value of dispersion compensation to be applied by the first TDCM to bring the RD of the first path within the defined RD range;
      c) if the first TDCM is crossed by at least one other path, checking that the respective RD of said at least one other path is within a respective defined RD range for said different value of dispersion compensation; and
      d) generating at least one control signal comprising instructions configured to set the first TDCM to apply said different value of dispersion compensation; and
   responsive to said checking indicating that the respective RD of at least one of said lowest number of other paths is outside the respective defined RD range:
      identifying a further TDCM crossed by the first path, wherein the further TDCM is crossed by the next lowest number of paths and is configured to apply a respective value of dispersion compensation; and
      performing steps b) and c) for the further TDCM,
   wherein said step of identifying a further TDCM and steps b) and c) are iterated until a further TDCM crossed by the first path is identified for which the respective RDs of all the other paths that cross said TDCM are within the respective defined RD ranges or until all TDCMs crossed by the first path have been considered.

2. The method as claimed in claim 1, further comprising, if all TDCMs crossed by the first path have been considered, determining a new route for at least one of said lowest number of other paths so that said path no longer crosses the first TDCM and wherein said at least one control signal comprises instructions configured to set the first TDCM to said different value of dispersion compensation determined for the first TDCM.

3. The method as claimed in claim 1, wherein the optical transport network comprises nodes and links connecting pairs of nodes and wherein the first TDCM and the further TDCMs are equivalent TDCMs.

4. The method as claimed in claim 1, wherein the defined RD ranges are a system RD range of the optical transport network.

5. The method as claimed in claim 1, wherein the first path is a new path to be added in the optical transport network.

6. The method as claimed in claim 1, wherein the first path is an existing path and the method is performed following teardown of another path within the optical transport network, and wherein the defined RD ranges lie within a system RD range of the optical transport network.

7. A method of adding a first path from a first node to a second node in an optical transport network, the method comprising steps of:
   computing a route for the first path across the optical transport network; and
   performing the method of controlling compensation of chromatic dispersion in the optical transport network according to claim 1.

8. The method as claimed in claim 7, wherein if the RD of the first path is outside the defined RD range, the method further comprises:
   computing a different route for the first path across the optical transport network and determining whether the residual dispersion (RD) of the first path on the different route is within the defined RD range, wherein said computing and determining are iterated until a route is identified for which the RD of the first path is within the defined RD range or until all potential routes have been considered for the first path; and
   if all potential routes have been considered without finding a route for which the RD of the first path is within the defined RD range, proceeding to the step of identifying a first TDCM.

9. An apparatus for controlling compensation of chromatic dispersion in an optical transport network, the apparatus comprising a processing circuitry and a memory, said memory containing instructions executable by said processing circuitry whereby said apparatus is operative to:
   determine whether a residual dispersion (RD) of a first path within the optical transport network is within a defined RD range; and
   if the RD of the first path is outside the defined RD range:
      a) identify a first tuneable dispersion compensation module (TDCM) crossed by the first path, the first TDCM configured to apply a respective value of dispersion compensation, wherein the apparatus is operative to identify the first TDCM by identifying a TDCM crossed by a lowest number of other paths;
      b) determine a different value of dispersion compensation to be applied by the first TDCM to bring the RD of the first path within the defined RD range;
      c) if the first TDCM is crossed by at least one other path, check that the respective RD of said at least one other path is within a respective defined RD range for said different value of dispersion compensation; and
      d) generate at least one control signal comprising instructions configured to set the first TDCM to apply said different value of dispersion compensation,
   wherein said memory comprises instructions executable by said processing circuitry,
   whereby said apparatus is further operative, responsive to said check indicating that the respective RD of at least one of said lowest number of other paths is outside the respective defined RD range, to:
      identify a further TDCM crossed by the first path, wherein the further TDCM is crossed by the next lowest number of paths and is configured to apply a respective value of dispersion compensation; and
      perform steps b) and c) for the further TDCM,
      and iterate said step of identifying a further TDCM and steps b) and c) until a further TDCM crossed by the first path is identified for which the respective RDs of all the other paths that cross said TDCM are within the respective defined RD ranges or until all TDCMs crossed by the first path have been considered.

10. The apparatus as claimed in claim 9, wherein said memory comprises instructions executable by said processing circuitry whereby said apparatus is further operative to, responsive to all TDCMs crossed by the first path having been considered, determine a new route for at least one of said lowest number of other paths so that said path no longer crosses the first TDCM and generate said at least one control signal to comprise instructions configured to set the first TDCM to said different value of dispersion compensation determined for the first TDCM.

11. The apparatus as claimed in claim 9, wherein the optical transport network comprises nodes and links connecting pairs of nodes and wherein the first TDCM and the further TDCMs are equivalent TDCMs .

12. The apparatus as claimed in claim 9, wherein the defined RD ranges are a system RD range of the optical transport network.

13. An apparatus for adding a first path from a first node to a second node in an optical transport network, the apparatus comprising a processing circuitry and a memory, said memory containing instructions executable by said processing circuitry whereby said apparatus is operative to:
compute a route for the first path across the optical transport network;
determine whether a residual dispersion (RD) of the first path is within a defined RD range; and
if the RD of the first path is outside the defined RD range:
a) identify a first tunable dispersion compensation module (TDCM) crossed by the first path, the first TDCM configured to apply a respective value of dispersion compensation, wherein the apparatus is operative to identify the first TDCM by identifying a TDCM crossed by a lowest number of other paths;
b) determine a different value of dispersion compensation to be applied by the first TDCM to bring the RD of the first path within the defined RD range;
c) if the first TDCM is crossed by at least one other path, check that the respective RD of said at least one other path is within a respective defined RD range for said different value of dispersion compensation; and
d) generate at least one control signal comprising instructions configured to set the first TDCM to apply said different value of dispersion compensation,
wherein said memory comprises instructions executable by said processing circuitry, whereby said apparatus is further operative, responsive to said check indicating that the respective RD of at least one of said lowest number of other paths is outside the respective defined RD range, to:
identify a further TDCM crossed by the first path, wherein the further TDCM is crossed by the next lowest number of paths and is configured to apply a respective value of dispersion compensation; and
perform steps b) and c) for the further TDCM,
and iterate said step of identifying a further TDCM and steps b) and c) until a further TDCM crossed by the first path is identified for which the respective RDs of all the other paths that cross said TDCM are within the respective defined RD ranges or until all TDCMs crossed by the first path have been considered.

14. The apparatus as claimed in claim 13, wherein said memory contains instructions executable by said processing circuitry whereby said apparatus is operative, responsive to the RD of the first path being outside the defined RD range, to:
compute a different route for the first path across the optical transport network; determine whether the residual dispersion, RD, of the first path on the different route is within the defined RD range;
iterate said computing and determining until a route is identified for which the RD of the first path is within the defined RD range or until all potential routes have been considered for the first path; and
if all potential routes have been considered without finding a route for which the RD of the first path is within the defined RD range, proceed to a).

15. An optical transport network comprising nodes and links connecting pairs of nodes and an apparatus for controlling compensation of chromatic dispersion in said optical transport network, the apparatus comprising a processing circuitry and a memory, said memory containing instructions executable by said processing circuitry whereby said apparatus is operative to:
determine whether a residual dispersion (RD) of a first path within the optical transport network is within a defined RD range; and if the RD of the first path is outside the defined RD range:
a) identify a first tuneable dispersion compensation module (TDCM) crossed by the first path, the first TDCM configured to apply a respective value of dispersion compensation, wherein the apparatus is operative to identify the first TDCM by identifying a TDCM crossed by a lowest number of other paths;
b) determine a different value of dispersion compensation to be applied by the first TDCM to bring the RD of the first path within the defined RD range;
c) if the first TDCM is crossed by at least one other path, check that the respective RD of said at least one other path is within a respective defined RD range for said different value of dispersion compensation; and
d) generate at least one control signal comprising instructions configured to set the first TDCM to apply said different value of dispersion compensation;
and
wherein said memory comprises instructions executable by said processing circuitry, whereby said apparatus is further operative, responsive to said check indicating that the respective RD of at least one of said lowest number of other paths is outside the respective defined RD range, to:
identify a further TDCM crossed by the first path, wherein the further TDCM is crossed by the next lowest number of paths and is configured to apply a respective value of dispersion compensation; and
perform steps b) and c) for the further TDCM,
and iterate said step of identifying a further TDCM and steps b) and c) until a further TDCM crossed by the first path is identified for which the respective RDs of all the other paths that cross said TDCM are within the respective defined RD ranges or until all TDCMs crossed by the first path have been considered.

16. The optical transport network as claimed in claim 15, wherein said apparatus is operative to compute a route for the first path across the optical transport network to add the first path from a first node to a second node in the optical transport network.

* * * * *